(Model.)
J. M. NORWOOD.
BEE HIVE.
No. 247,395. Patented Sept. 20, 1881.
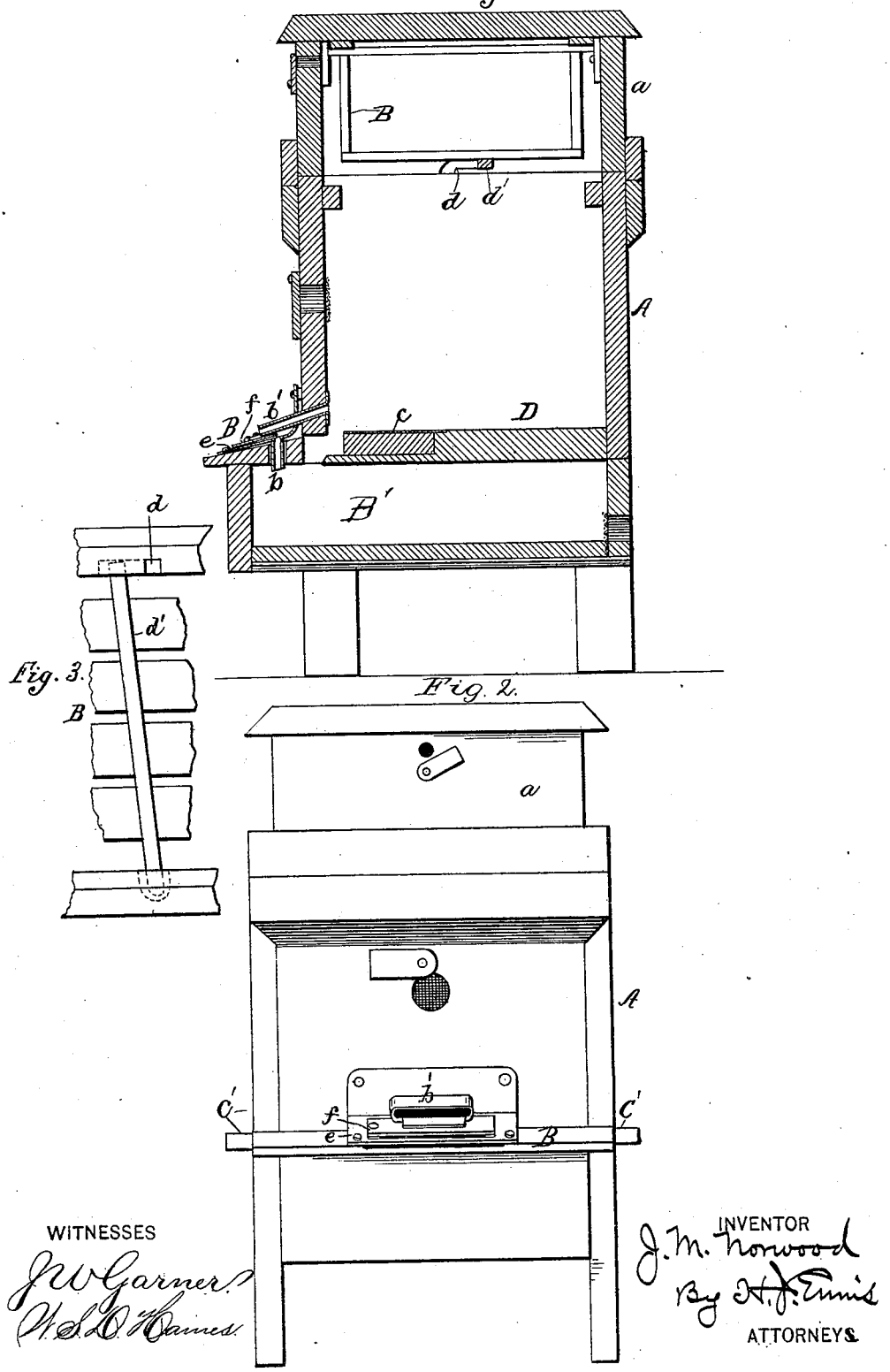

UNITED STATES PATENT OFFICE.

JOHN M. NORWOOD, OF KERRVILLE, TEXAS.

BEE-HIVE.

SPECIFICATION forming part of Letters Patent No. 247,395, dated September 20, 1881.

Application filed April 29, 1881. (Model.)

*To all whom it may concern:*

Be it known that I, JOHN M. NORWOOD, a citizen of the United States, residing at Kerrville, in the county of Kerr and State of Texas, have invented certain new and useful Improvements in Bee-Hives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a vertical section of my improved bee-hive. Fig. 2 is a side elevation of the same. Fig. 3 illustrates in plan the attachment of the comb-frames within the upper section of the hive.

This invention relates to bee-hives; and it consists in certain improvements in the construction of the same, as shown, and specified in the claim herein.

Referring to the accompanying drawings, A designates the main casing of the hive, provided with suitable ventilating-apertures, and having a removable upper section, $a$, and a lower compartment, B', under the main floor D.

B indicates the bee-alighting platform, and $b'$ the entrance to the interior.

As shown in Fig. 1, the lower compartment, B', is extended forward farther than the front wall of the hive and under the platform B.

As is well known, the entrance to the interior of the hive is usually guarded by the bees, and the insect known as the "moth" crawls about and obtains access through cracks or small openings. To prevent the moth entering the hive, the tube $b'$, forming the entrance, is fixed in the casing, so that it is held somewhat above the platform B, on which is fixed a moth-guard under the entrance $b'$. This moth-guard consists of plates $e$ and $f$, usually of sheet metal, fastened to the platform in such manner that a crack or narrow opening is formed between the plate $e$ and the platform B, and a like opening is formed between the plates $e$ and $f$, forming passages through which the moth may crawl in attempting to gain an entrance. Apertures are made in the platform leading from the moth-passage under plate $e$ to the compartment B' below. One or more tubes, $b$, pass through the platform and lead from the passage between plates $e$ and $f$ to the chamber B'. The mouth of tube $b'$ is usually elevated a little from the platform, so as not to be readily reached by crawling insects. These usually crawl under the plates $e$ and $f$, from whence they find their way down into the chamber B'. This chamber or compartment is removable and may be drawn out at the rear of the hive.

The floor D is made close and provided with a slide, $c$, toward the front, which may be opened and closed by means of the arms $c'$, projecting through slots in the sides of the hive, this being intended to facilitate the removal of the cuttings which accumulate on the floor D. The slide $c$ being opened, the hive is inclined forward, so that the cuttings and dust fall through the opening into the chamber B' below, after which the slide is closed. This being done from time to time, the accumulations in the chamber B' serve to attract the moth through the passages from the platform B to the compartment B', and they are further attracted by the light from the wire-covered aperture $h$ at the rear of B'.

Provision is made in the body of the hive or main chamber of the house A for supporting the comb or honey frames. The surplus honey or comb frames B are inserted into the detachable or removable section $a$ when taken off the body of the house and inverted, their upper bars being inserted between cleats fastened to the inside of the top of the said section. Slots $d$ are cut in the insides of the section $a$, near its lower edges, of a right-angled form, as seen in Fig. 1. The bar $d'$ is entered at the vertical part of the slots, and then slid into the horizontal portion thereof, which firmly secures the comb-frames removably in position in the section $a$.

Having thus fully described my invention, I claim and desire to secure by Letters Patent—

In a bee-hive, the combination, with the removable section $a$, having the right-angled slots $d$, and the comb-frames B, of the securing-bar $d'$, substantially as and for the purpose set forth.

In testimony whereof I sign my name in the presence of two witnesses.

JOHN M. NORWOOD.

Witnesses:
CHAS. JOHNSON,
NATHAN HERZOG.